United States Patent
Cho et al.

(10) Patent No.: US 12,189,240 B2
(45) Date of Patent: Jan. 7, 2025

(54) CURVED DISPLAY PANEL AND MANUFACTURING METHOD THEREOF AND DISPLAY DEVICE

(71) Applicant: HKC CORPORATION LIMITED, Guangdong (CN)

(72) Inventors: En-tsung Cho, Guangdong (CN); Yuming Xia, Guangdong (CN); Guiqing Du, Guangdong (CN); Zhipeng He, Guangdong (CN); Haoxuan Zheng, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/334,987

(22) Filed: Jun. 14, 2023

(65) Prior Publication Data
US 2024/0142825 A1 May 2, 2024

(30) Foreign Application Priority Data
Nov. 2, 2022 (CN) .......................... 202211359354.6

(51) Int. Cl.
*G02F 1/1337* (2006.01)
*G02F 1/1341* (2006.01)

(52) U.S. Cl.
CPC ...... *G02F 1/133761* (2021.01); *G02F 1/1337* (2013.01); *G02F 1/13378* (2013.01); *G02F 1/1341* (2013.01); *G02F 1/133753* (2013.01)

(58) Field of Classification Search
None
See application file for complete search history.

(56) References Cited

U.S. PATENT DOCUMENTS 6,259,501 B1 7/2001 Yaniv
2021/0405460 A1* 12/2021 Zhao ................ G02F 1/133773

FOREIGN PATENT DOCUMENTS

| CN | 111025772 A | 4/2020 |
| JP | 2010078660 A | 4/2010 |
| JP | 2010078998 A | 4/2010 |
| JP | 2014211592 A | 11/2014 |

OTHER PUBLICATIONS

The first office action issued in corresponding CN application No. 202211359354.6 dated Dec. 20, 2022.

* cited by examiner

*Primary Examiner* — Richard H Kim
(74) *Attorney, Agent, or Firm* — HAUPTMAN HAM, LLP

(57) ABSTRACT

The present disclosure provides a curved display panel and a manufacturing method thereof and a display device. The curved display panel includes a first substrate, a second substrate, a liquid crystal layer, a first alignment layer and a second alignment layer. The first substrate and the second substrate are opposite to each other. The first alignment layer is located on a surface of the first substrate facing the second substrate. The second alignment layer is located on a surface of second substrate facing the first substrate. The liquid crystal layer is located between the first alignment layer and the second alignment layer. The first alignment layer includes a porous structure layer and alignment materials. The porous structure layer defines a plurality of spaced filling holes. The plurality of filling holes are perpendicular to the surface of the first substrate. The alignment materials are filled within the plurality of filling holes.

10 Claims, 5 Drawing Sheets

CURVED DISPLAY PANEL AND MANUFACTURING METHOD THEREOF AND DISPLAY DEVICE

CROSS-REFERENCE TO RELATED APPLICATIONS

This application claims priority benefits to Chinese Patent Application No. 202211359354.6, filed Nov. 2, 2022, the contents of which are incorporated herein by reference.

TECHNICAL FIELD

The present disclosure relates to the fields of liquid crystals, and in particular to a curved display panel and a manufacturing method thereof and a display device.

BACKGROUND

As electronic devices are updated and iterated, the demands from the users to the electronic devices are getting higher and higher. Curved screen is a kind of screen suitable for ergonomic. Curved screen technology can increase a user's visible range and enhance the user's experience. However, in the case of curved LCD screen, a bending of an upper substrate and a lower substrate causes displacement deviations, which can affect a display effect during use, such as black clusters.

SUMMARY

Embodiments of the present disclosure discloses a curved display panel and a manufacturing method thereof and a display device, which can reduce a phenomenon of dark cluster in a display image of the curved display panel and improve a display effect.

In a first aspect, the present disclosure provides a curved display panel. The curved display panel includes a first substrate, a second substrate, a liquid crystal layer and a first alignment layer. The first substrate and the second substrate are spaced apart and opposite to each other. The liquid crystal layer and the first alignment layer are both located between the first substrate and the second substrate.

The first alignment layer is located on a surface of the first substrate facing the liquid crystal layer. The first alignment layer includes a porous structure layer and alignment materials. The porous structure layer defines a plurality of spaced filling holes. An opening of each filling hole is defined on a surface of the porous structure layer away from the first substrate. Each filling hole extends along a thickness direction of the porous structure layer. The alignment materials are filled within the plurality of the filling holes.

A pre-tilt angle of liquid crystal molecules of the liquid crystal layer close to the first alignment layer is 90°.

It can be understood that, during in use, the curved display panel may have black shadows or dark clusters on a display image due to poor coordination between the liquid crystal molecules close to the first substrate and the liquid crystal molecules close to the second substrate. In the present disclosure, the alignment materials in each filling hole of the first alignment layer are set perpendicular to a surface of the first substrate; when a voltage is applied on both sides of the liquid crystal layer, the pre-tilt angle of the liquid crystal molecules close to the first alignment layer will be maintained at 90°, which allows the light passing through the liquid crystal molecules close to the second alignment layer always passing through the liquid crystal molecules close to the first substrate, thus solving the problem of the curved display panel in the prior art where black clusters appear due to the light not being able to pass through the liquid crystal layer.

In a second aspect, the present disclosure provides a display device. The device includes a housing and a curved display panel as described above. The curved display panel is connected to the housing.

In a third aspect, the present disclosure provides a manufacturing method of a curved display panel. The manufacturing method includes following steps.

A first substrate, a second substrate, and a liquid crystal layer are provided;

A porous structure layer is formed on a surface of the first substrate; the porous structure layer defines a plurality of spaced filling holes; an opening of each filling hole is defined on a surface of the porous structure layer away from the first substrate; each filling hole extends along a thickness direction of the porous structure layer;

The filling holes of the porous structure layer are filled with alignment materials to form a first alignment layer;

The first substrate having the first alignment layer, the liquid crystal layer and the second substrate are assembled to be the curved display panel.

BRIEF DESCRIPTION OF THE ACCOMPANYING DRAWINGS

In order to illustrate technical solutions of the present disclosure more clearly, the following is a brief description of the accompanying drawings to be used in the embodiments. Obviously, the accompanying drawings in the following description are only some of the embodiments of the present disclosure. For a person of ordinary skill in the art, with reference to these drawings, other accompanying drawings can be obtained without any creative work.

DETAILED DESCRIPTION OF ILLUSTRATED EMBODIMENTS

For ease of understanding, firstly, the terms involved in the embodiments of the present disclosure are explained.

And/or: is simply an association relationship describing an associated object, indicating that three relationships can exist, for example, A and/or B, which can indicate: a presence of A alone, a presence of both A and B, and a presence of B alone.

Multiple: means two or more than two.

Connect: should be understood in a broad sense, for example, A is connected to B, which can be that A is directly connected to B or that A is indirectly connected to B through an intermediary.

Specific embodiments of the present disclosure will be clearly described below with reference to the accompanying drawings.

As electronic devices are updated and iterated, the demands from the users to the electronic devices are getting higher and higher. Curved screen is a kind of screen suitable for ergonomic. Curved screen technology can increase a user's visible range and enhance the user's experience. However, in the case of curved LCD screen, a bending of an upper substrate and a lower substrate causes displacement deviations, which can affect a display effect during use, such as black clusters.

On the basis of this, the present disclosure provides a curved display panel and a manufacturing method thereof, and a display device, which can reduce a phenomenon of black clusters in the display image of the curved display device and improve the display effect.

The display device includes a housing and a curved display panel. The curved display panel is connected to the housing to form the display device. In detail, the display device can be a cellphone, a notebook computer, a tablet personal computer, a laptop computer, a personal digital assistant, a wearable device, a mobile device, and the like. In the present disclosure, the display device is taking a curved gaming monitor as an example, but it should be understood that it is not limited to this. For example, the curved display panel of the present disclosure may have a curvature between R600~R1800. In detail, the curvature of the display panel may be R1000 (radius of curvature of 1 m), R1500 (radius of curvature of 1.5 m) or R1800 (radius of curvature of 1.8 m), and the like.

The curved display panel may include a backlight assembly and a liquid crystal box. The backlight assembly provides backlight to the liquid crystal box. For example, the backlight assembly may employ light emitting diodes to emit the backlight. The light emitting diode may be an organic light-emitting diode (OLED), an active-matrix organic light-emitting diode (AMOLED), a mini organic light-emitting diode, a micro light-emitting diode, a micro organic light-emitting diode, a quantum dot light emitting diode (QLED), and the like. The backlight assembly may be a direct downward backlight or a side-entry backlight. The present disclosure does not specifically limit the type of the backlight assembly.

Figure 1:
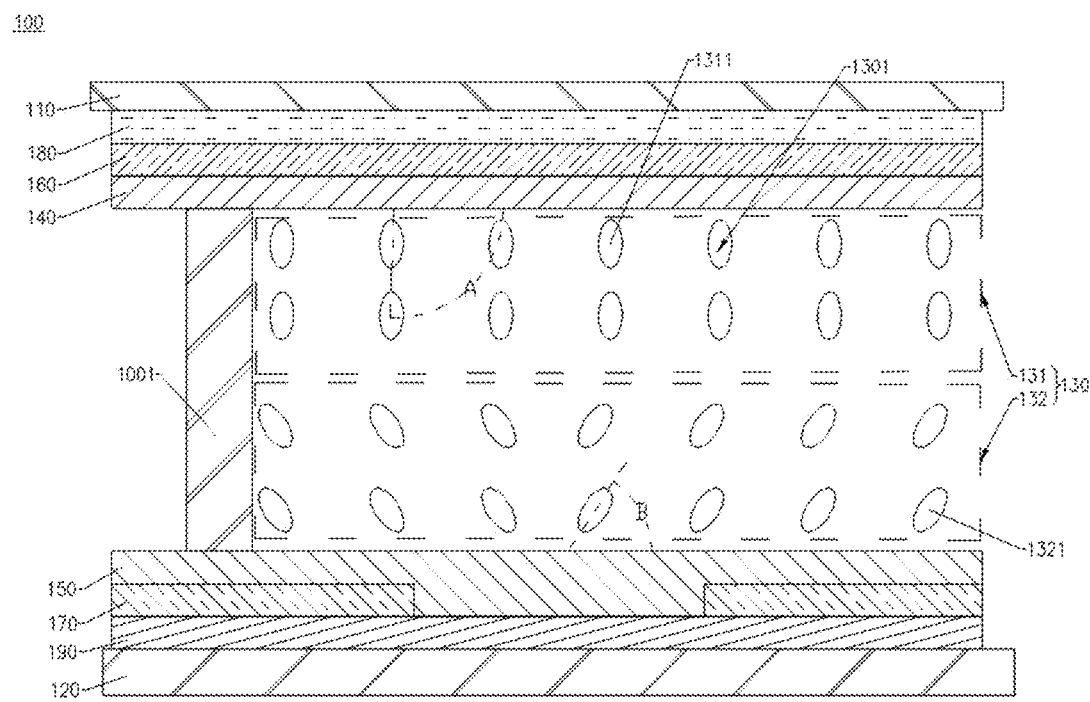
FIG. 1 is a schematic cross-sectional view of a liquid crystal box according to one embodiment of the present disclosure.

Referring to FIG. 1, FIG. 1 is a schematic cross-sectional view of a liquid crystal box 100 according to one embodiment of the present disclosure.

The liquid crystal box 100 may include a first substrate 110, a second substrate 120, a liquid crystal layer 130, a first alignment layer 140, a second alignment layer 150, a first conductive layer 160, a second conductive layer 170, a light shielding layer 180 and a thin film transistor layer 190.

It should be noted that the purpose of FIG. 1 is only to describe a connection relationship of the first substrate 110, the second substrate 120, the liquid crystal layer 130, the first alignment layer 140, the second alignment layer 150, the first conductive layer 160, the second conductive layer 170, the light shielding layer 180 and the thin film transistor layer 190 schematically, and is not intended to specifically limit the connecting position, the specific construction and the quantity of each structure. The structure illustrated in the present disclosure does not constitute a specific limitation of the curved display panel. In other embodiments of the present disclosure, the curved display panel may include more or fewer components than illustrated, or a combination of certain components, or a splitting of certain components, or a different arrangement of components. The illustrated components may be implemented as hardware, software or a combination of software and hardware.

The first substrate 110 and the second substrate 120 are space apart and opposite to each other. The liquid crystal layer 130, the first alignment layer 140 and the second alignment layer 150 are both located between the first substrate 110 and the second substrate 120. The first alignment layer 140 is located on a surface of the first substrate 110 facing the liquid crystal layer 130. The second alignment layer 150 is located on a surface of the second substrate 120 facing the first substrate 110. The liquid crystal layer 130 is located between the first alignment layer 140 and the second alignment layer 150. The first conductive layer 160 is located between the first alignment layer 140 and the first substrate 110. The light shielding layer 180 is located between the first conductive layer 160 and the first substrate 110. The second conductive layer 170 is located between the second alignment layer 150 and the second substrate 120. The thin film transistor layer 190 is located between the second substrate 120 and the second conductive layer 170.

The roles of the first alignment layer 140 and the second alignment layer 150 are guiding the arrangements of the liquid crystal molecules 1301 of the liquid crystal layer 130.

Figure 2:
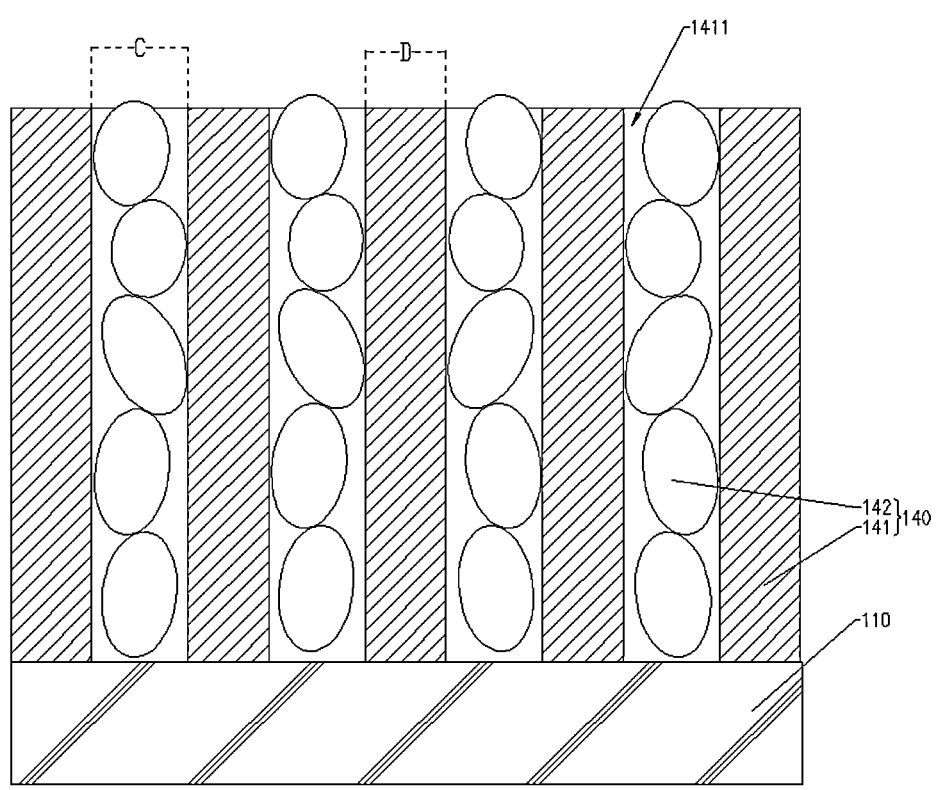
FIG. 2 is a schematic cross-sectional view of a first alignment layer according to one embodiment of the present disclosure.
Figure 3:
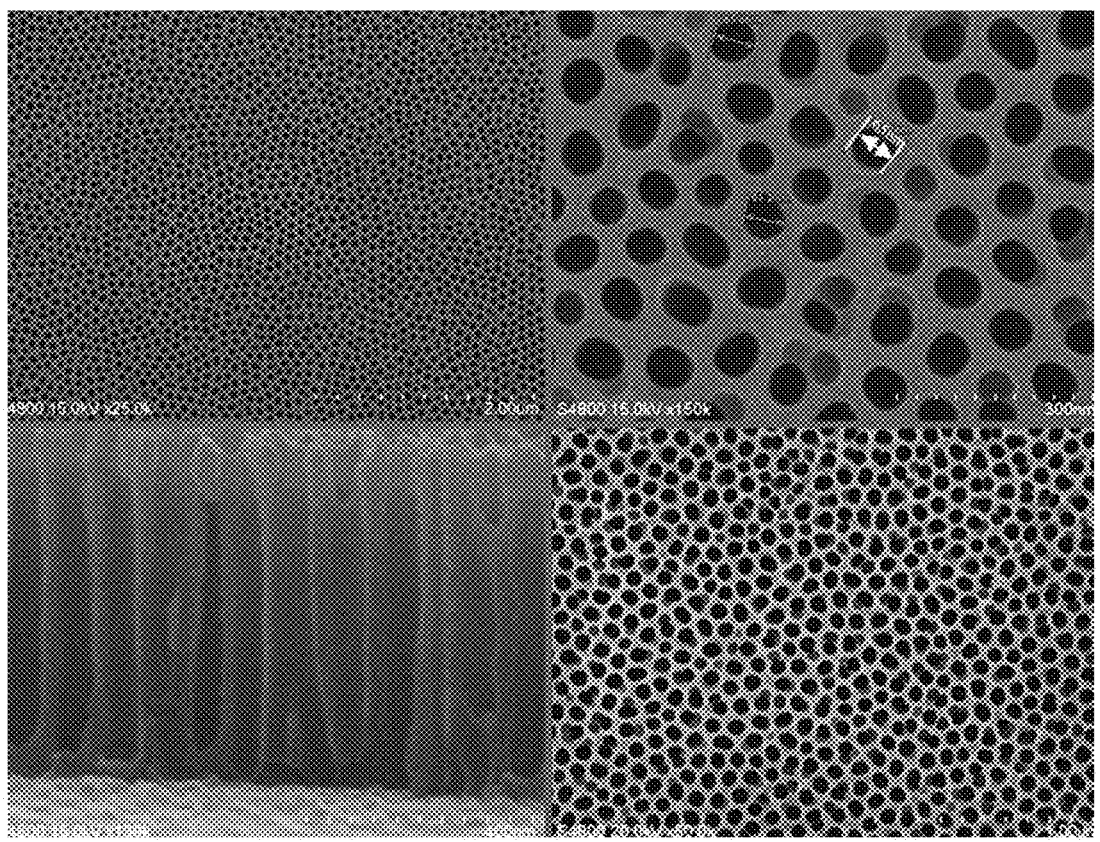
FIG. 3 is a scanning electron microscope view of a porous structure layer of the first alignment layer shown in FIG. 2.

Referring to FIGS. 2 and 3, FIG. 2 is a schematic cross-sectional view of a first alignment layer 140 according to one embodiment of the present disclosure; FIG. 3 is a scanning electron microscope view of a porous structure layer 141 of the first alignment layer 140 shown in FIG. 2. The first alignment layer 140 includes a porous structure layer 141 and alignment materials 142. The porous structure layer 141 is connected to a surface of the first substrate 110 facing the second substrate 120. The porous structure layer 141 defines a plurality of filling holes 1411. The plurality of filling holes 1411 can be defined at intervals to each other. The plurality of filling holes are perpendicular to the surface of the first substrate 110 away from the second substrate 120. The opening of the filling hole 1411 is defined on the surface of the porous structure layer 141 away from the first substrate 110. That is to say, each filling hole 1411 can extend along a thickness direction of the porous structure layer 141. The alignment materials 142 are filled within the plurality of filling holes 1411. A diameter C of the filling hole 1411 may be less than or equal to 100 nm. A distance D between two adjacent filling holes 1411 may be less than 100 nm. In detail, the diameter C of the filling hole 1411 can be 65 nm. For example, the porous structure layer 141 may be mesoporous silica. Exemplarily, the alignment materials 142 may be one or more of diamond-like carbon films (DLC), silicon carbide (SiC), silicon oxide ($SiO_2$), silicon nitride (SiN), glass, aluminium oxide ($Al_2O_3$), cerium dioxide ($CeO_2$), zinc ion-doped titanium oxide ($ZnTiO_2$), polyimide (PI), and/or polymethyl methacrylate (PMMA), and the like. The alignment materials 142 preferably use polyimide (PI).

It should be noted that, during a formation of the hole structures in porous structure layer 141, the porous structure layer 141 may have hole structures that are parallel to the first substrate 110 or at an acute angle to the first substrate 110. The quantity of the filling holes 1411 is at least half of all the hole structures in the porous structure layer 141.

The second alignment layer 150 may be formed on a surface of the second conductive layer 170 by liquid coating and rotary printing. The second alignment layer 150 may defines a plurality of parallel grooves. The first liquid crystal molecules 1311 may lie across the grooves along a direction of the grooves to achieve a regular arrangement of the liquid crystal molecules 1301. The materials of the second alignment layer 150 may include one or more of diamond-like carbon films (DLC), silicon carbide (SiC), silicon oxide (SiO$_2$), silicon nitride (SiN), glass, aluminium oxide (Al$_2$O$_3$), cerium dioxide (CeO$_2$), zinc ion-doped titanium oxide (ZnTiO$_2$), polyimide (PI), and/or polymethyl methacrylate (PMMA), and the like. The present disclosure does not specifically limit the materials of the second alignment layer 150.

Referring to FIG. 1, the liquid crystal layer 130 includes a first liquid crystal layer 131 and a second liquid crystal layer 132. The first liquid crystal layer 131 is located on a surface of the first alignment layer 140 away from the first substrate 110. The second liquid crystal layer 132 is located on a surface of the second alignment layer 150 away from the second substrate 120. That is to say, the second liquid crystal layer 132 is located between the second alignment layer 150 and the first liquid crystal layer 131. The first liquid crystal layer 131 includes a plurality of first liquid crystal molecules 1311. A pre-tilt angle A of the first liquid crystal molecules 1311 is 90°. The pre-tilt angle A of the first liquid crystal molecules 1311 is an angle between a long axis of the first liquid crystal molecules 1311 and a surface of the first alignment layer 140 away from the first substrate 110. The second liquid crystal layer 132 includes a plurality of second liquid crystal molecules 1321. A pre-tilt angle B of the second liquid crystal molecules 1321 may be 86°~88.5° (including the endpoint values 86° and 88.5°). The pre-tilt angle B of the second liquid crystal molecules 1321 is an angle between a long axis of the second liquid crystal molecules 1321 and a surface of the second alignment layer 150 away from the second substrate 120. The range of the pre-tilt angle A of the first liquid crystal molecules 1311 and the pre-tilt angle B of the second liquid crystal molecules 1321 are both greater than 0° and less than or equal to 90°.

For example, the pre-tilt angle B of the second liquid crystal molecules 1321 may also be greater than 88°, or, alternatively, the pre-tilt angle B of the second liquid crystal molecules 1321 may also be less than 87°, and the present disclosure may not specifically limit the pre-tilt angle B of the second liquid crystal molecules 1321.

It can be understood that the curved display panels of the prior art may, during in use, suffer from poor alignment between the liquid crystal molecules close to the first substrate and the liquid crystal molecules close to the second substrate, resulting in black shadows or dark clusters on the display image.

Alternatively, an electric field can be formed between the first substrate 110 and the second substrate 120 after a voltage is applied to opposite sides of the liquid crystal layer 130. The change in the electric field can cause a change in an alignment state of the first liquid crystal molecules 1311 and the second liquid crystal molecules 1321, which in turn causes a change in the optical properties of the liquid crystal box 100, for the display of the image.

The present disclosure sets the alignment materials 142 within each filling hole 1411 in the first alignment layer 140 perpendicular to the surface of the first substrate 110. When a voltage is applied to opposite sides of the liquid crystal layer 130, the first pre-tilt angle A of the first liquid crystal molecules 1311 will be maintained at 90° due to the action of the alignment materials 142, so that the light passing through the second liquid crystal molecules 1321 can always pass through the first liquid crystal molecules 1311. This solves the problem of the curved display panel in the prior art where black clusters appear due to the light not being able to pass through the liquid crystal layer 130.

For example, please refer to FIG. 1, a spacer 1001 may be provided between the first substrate 110 and the second substrate 120. In detail, the spacer 1001 is located between the first alignment layer 140 and the second alignment layer 150. A thickness of the spacer 1001 is a box thickness of the liquid crystal box 100. For example, the quantity of the spacer 1001 may be multiple, and the multiple spacers 1001 are located between the first substrate 110 and the second substrate 120 separately, such that the first substrate 110 and the second substrate 120 are spaced apart by a certain distance. A shape of the spacer 1001 may be spherical or cylindrical. The materials of the spacer 1001 may be resin or glass, etc. The present disclosure does not limit the specific shape or materials of the spacer 1001.

Figure 4:
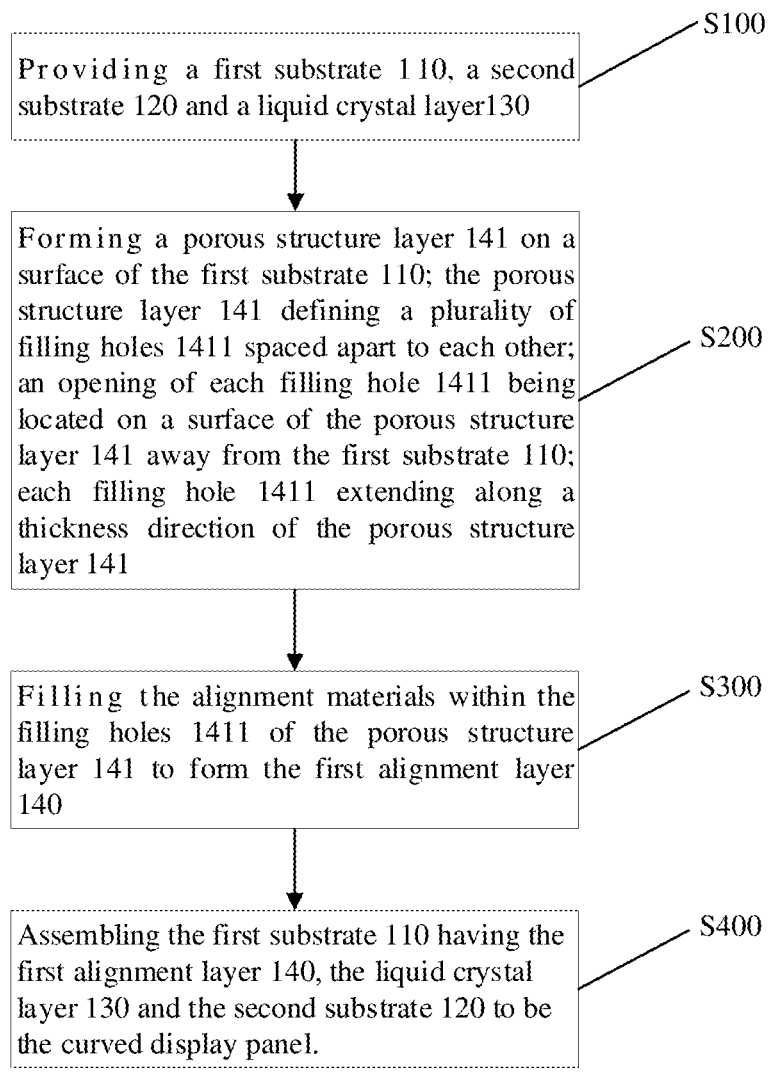
FIG. 4 is a flowchart of a manufacturing method of a curved display panel according to one embodiment of the present disclosure.

Referring to FIG. 4, FIG. 4 is a flowchart of a manufacturing method of a curved display panel according to one embodiment of the present disclosure. The manufacturing method of the curved display panel provided in the present disclosure is used to adjust a pre-tilt angle of the liquid crystal molecules 1301 of the liquid crystal layer 130. The specific structure of the curved display panel can be referred to in FIGS. 1~3 and described above. In the description of the method below, the improvements to the structure of the curved display panel can be applied to the description of the curved display panel above, to the extent that they do not conflict with each other. The methods include following steps.

S100: A first substrate 110, a second substrate 120 and a liquid crystal layer 130 are provided.

S200: A porous structure layer 141 is formed on a surface of the first substrate 110. The porous structure layer 141 defines a plurality of filling holes 1411 spaced apart to each other. An opening of each filling hole 1411 is located on a surface of the porous structure layer 141 away from the first substrate 110, and each filling hole 1411 extends along a thickness direction of the porous structure layer 141.

S300: The alignment materials 142 are filled within the filling holes 1411 of the porous structure layer 141 to form the first alignment layer 140.

S400: The first substrate 110 having the first alignment layer 140, the liquid crystal layer 130 and the second substrate 120 are assembled to be the curved display panel.

Figure 5:
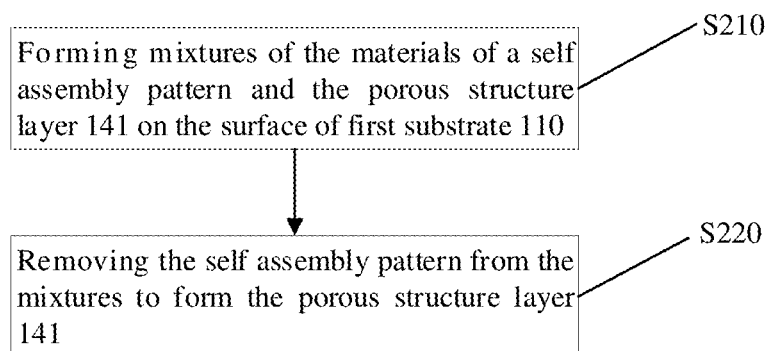
FIG. 5 is a flowchart of step S200 in the manufacturing method provided in FIG. 4.

Referring to FIG. 5, FIG. 5 is a flowchart of step S200 in the manufacturing method provided in FIG. 4. Step S200 will be further described below.

S200: A porous structure layer 141 is formed on a surface of first substrate 110. In detail, S200 also includes S210 and S220.

S210: Mixtures of the materials of a self assembly pattern and the porous structure layer 141 are formed on the surface of first substrate 110.

In detail, the surfactant micelles are arranged in a self-assembly pattern having a shape of hexagonal matrix by using self-assembly techniques; the material of the self-assembly pattern and the porous structure layer 141 are mixed, to form an organic/inorganic hybrid microstructured material; and then the mesoporous materials are formed by drying and calcination the microstructured material. The surfactants can be one of cetyltrimethylammonium bromide (CTAB), polyethylene oxide-polypropylene oxide-polyethylene oxide (PEO-PPO-PEO, P123) or polyethylene oxide-polyoxypropylene-polyethylene oxide (PEG-PPG-PEG. F127: Poly).

S220: The self assembly pattern is removed from the mixtures to form the porous structure layer 141.

Figure 6:
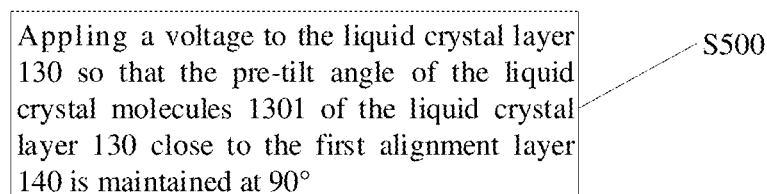
FIG. 6 is a flowchart of another manufacturing method of a curved display panel according to one embodiment of the present disclosure.

Referring to FIG. 6, FIG. 6 is a flowchart of another manufacturing method of a curved display panel according to one embodiment of the present disclosure. The present disclosure also provides another manufacturing method for curved display panels, which is the same as the first manufacturing method described above without going into detail, but differs from the first manufacturing method in that: the curved display panel manufacturing method may include at least S500 in addition to S100-S400, as described in detail below.

S500: A voltage is applied to the liquid crystal layer 130 so that the pre-tilt angle of the liquid crystal molecules 1301 of the liquid crystal layer 130 close to the first alignment layer 140 is maintained at 90°.

The above embodiments have been described in detail, and specific examples have been applied in this paper to illustrate the principles and implementation of the present disclosure. The above embodiments are only used to help understand the method of the present disclosure and its core ideas. At the same time, for a person of ordinary skill in the art, according to the ideas of the present disclosure, there will be changes in the specific implementation and application scope, in summary, the content of this specification should not be construed as a limitation of the present disclosure.

What is claimed is:

1. A curved display panel, wherein the curved display panel comprises a first substrate, a second substrate, a liquid crystal layer and a first alignment layer; the first substrate and the second substrate are spaced apart and opposite to each other; the liquid crystal layer and the first alignment layer are both located between the first substrate and the second substrate;

the first alignment layer is located on a surface of the first substrate facing the liquid crystal layer; the first alignment layer comprises a porous structure layer and alignment materials; the porous structure layer defines a plurality of spaced filling holes; an opening of each filling hole is defined on a surface of the porous structure layer away from the first substrate; each filling hole extends along a thickness direction of the porous structure layer; the alignment materials are filled within the plurality of the filling holes; a diameter of the filling hole is less than or equal to 100 nm; a distance between the two adjacent filling holes is less than 100 nm; and a pre-tilt angle of liquid crystal molecules in the liquid crystal layer close to the first alignment layer is 90°.

2. The curved display panel according to claim 1, wherein materials of the porous structure layer comprises mesoporous materials; the alignment materials comprise one or more of diamond-like film (DLC), silicon carbide (SiC), silicon oxide ($SiO_2$), silicon nitride (SiN), glass, aluminium oxide ($Al_2O_3$), cerium dioxide ($CeO_2$), zinc ion doped titanium oxide ($ZnTiO_2$), polyimide (PI), and/or polymethyl methacrylate (PMMA).

3. The curved display panel according to claim 1, wherein a pre-tilt angle of liquid crystal molecules in the liquid crystal layer close to the second substrate is between 86° ~88.5°.

4. The curved display panel according to claim 3, wherein the curved display panel further comprises a second alignment layer; the second alignment layer is located on a surface of the second substrate facing the liquid crystal layer.

5. The curved display panel according to claim 1, wherein a curvature of the curved display panel is between R600~R1800.

6. A display device, wherein the device comprises a housing and a curved display panel, the curved display panel is connected to the housing, the curved display panel comprises a first substrate, a second substrate, a liquid crystal layer and a first alignment layer; the first substrate and the second substrate are spaced apart and opposite to each other; the liquid crystal layer and the first alignment layer are both located between the first substrate and the second substrate;

the first alignment layer is located on a surface of the first substrate facing the liquid crystal layer; the first alignment layer comprises a porous structure layer and alignment materials; the porous structure layer defines a plurality of spaced filling holes; an opening of each filling hole is defined on a surface of the porous structure layer away from the first substrate; each filling hole extends along a thickness direction of the porous structure layer; the alignment materials are filled within the plurality of the filling holes; a diameter of the filling hole is less than or equal to 100 nm; a distance between the two adjacent filling holes is less than 100 nm; and a pre-tilt angle of liquid crystal molecules in the liquid crystal layer close to the first alignment layer is 90°.

7. The display device according to claim 6, wherein materials of the porous structure layer comprises mesoporous materials; the alignment materials comprise one or more of diamond-like film (DLC), silicon carbide (SiC), silicon oxide ($SiO_2$), silicon nitride (SiN), glass, aluminium oxide ($Al_2O_3$), cerium dioxide ($CeO_2$), zinc ion doped titanium oxide ($ZnTiO_2$), polyimide (PI), and/or polymethyl methacrylate (PMMA).

8. The display device according to claim 6, wherein a pre-tilt angle of liquid crystal molecules in the liquid crystal layer close to the second substrate is between 86° ~88.5°.

9. The display device according to claim 8, wherein the curved display panel further comprises a second alignment layer; the second alignment layer is located on a surface of the second substrate facing the liquid crystal layer.

10. The display device according to claim 6, wherein a curvature of the curved display panel is between R600~R1800.

* * * * *